(12) United States Patent
Schneider et al.

(10) Patent No.: US 9,411,369 B2
(45) Date of Patent: Aug. 9, 2016

(54) POWER DISTRIBUTION IN A DOCKING STATION

(71) Applicant: Apple Inc., Cupertino, CA (US)

(72) Inventors: Gerhard A. Schneider, Cupertino, CA (US); Scott Krueger, San Francisco, CA (US); Robert D. Watson, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 116 days.

(21) Appl. No.: 14/032,091

(22) Filed: Sep. 19, 2013

(65) Prior Publication Data

US 2015/0077926 A1 Mar. 19, 2015

(51) Int. Cl.
| | |
|---|---|
| G06F 1/16 | (2006.01) |
| G06F 1/18 | (2006.01) |
| G06F 1/26 | (2006.01) |
| H02J 7/00 | (2006.01) |
| H04M 1/04 | (2006.01) |
| H04M 1/725 | (2006.01) |

(52) U.S. Cl.
CPC .............. *G06F 1/1632* (2013.01); *G06F 1/189* (2013.01); *G06F 1/263* (2013.01); *G06F 1/266* (2013.01); *H02J 7/0044* (2013.01); *H02J 2007/0001* (2013.01); *H02J 2007/0096* (2013.01); *H04M 1/04* (2013.01); *H04M 1/72527* (2013.01)

(58) Field of Classification Search
CPC .................................................. G06F 1/1632
USPC ........................................................ 320/115
See application file for complete search history.

(56) References Cited

U.S. PATENT DOCUMENTS

| | | |
|---|---|---|
| 8,117,651 B2 | 2/2012 | Novotney et al. |
| 8,708,745 B2 | 4/2014 | Golko et al. |
| 2007/0204174 A1 | 8/2007 | Dorogusker et al. |
| 2010/0033127 A1 | 2/2010 | Griffin, Jr. et al. |
| 2010/0067197 A1 | 3/2010 | Guccione et al. |
| 2011/0035491 A1 | 2/2011 | Gelvin et al. |
| 2011/0167187 A1 | 7/2011 | Crumlin et al. |

(Continued)

FOREIGN PATENT DOCUMENTS

| | | |
|---|---|---|
| EP | 2 634 724 A1 | 9/2013 |
| TW | M403838 U | 5/2011 |

OTHER PUBLICATIONS

U.S. Appl. No. 14/022,015, filed Sep. 9, 2013 by Schneider et al.
International Search Report and Written Opinion of the International Searching Authority mailed on Oct. 29, 2014 for PCT Patent Application No. PCT/US2014/052463, 12 pages.

(Continued)

*Primary Examiner* — Thuan Do
(74) *Attorney, Agent, or Firm* — Kilpatrick Townsend & Stockton LLP

(57) ABSTRACT

Docking stations that may facilitate the sharing or transfer of power among a portable computing device, a docking station, and an accessory. One example may provide power from an accessory to a portable computing device. Switches may be used to avoid harm from inadvertent contact with voltages on exposed terminals. Another example may provide power directly from a battery on a portable computing device to an accessory. Another may limit this direct connection to a first type of accessory. Examples may limit a power connection to another type of accessory through a regulator. Another example may power one or more internal circuits either through a portable computing device or an accessory, depending on a mode of operation of the portable computing device.

29 Claims, 11 Drawing Sheets

(56) References Cited

U.S. PATENT DOCUMENTS

| | | |
|---|---|---|
| 2011/0299238 A1 | 12/2011 | Radin et al. |
| 2012/0096207 A1 | 4/2012 | Chen |
| 2013/0244489 A1 | 9/2013 | Terlizzi et al. |
| 2013/0332542 A1 | 12/2013 | Foo et al. |
| 2014/0163664 A1 | 6/2014 | Goldsmith |
| 2014/0223037 A1* | 8/2014 | Minoo .................. G06F 1/1632 710/16 |
| 2014/0239895 A1* | 8/2014 | Arendell ............. H01M 2/1005 320/112 |
| 2015/0070832 A1 | 3/2015 | Schneider et al. |

OTHER PUBLICATIONS

Jeremy Horwitz: "Review: Apple Universal Dock (2010)," Mar. 7, 2011, pp. 1-6, XP055147739, Retrieved from the internet: URL:http://www.ilounge.com/index.php/reviews/entry/apple-universal-dock-2010/[retreived on Oct. 20, 2014].

International Search Report and Written Opinion of the International Searching Authority mailed on Nov. 18, 2014 for PCT Patent Application No. PCT/US2014/052702, 14 pages.

International Preliminary Report on Patentability mailed Mar. 24, 2016, for PCT Application No. PCT/US2014/052463, 9 pages.

* cited by examiner

POWER DISTRIBUTION IN A DOCKING STATION

BACKGROUND

Portable computing devices, such as smartphones, music and video players, and others have become ubiquitous. The features and capabilities of these players have increased as well. As a result, the numbers and types of accessory devices that these players may communicate with have grown at a remarkable rate.

At the same time, it may be desirable to have docking stations that may be used to physically support these portable computing devices. The docking stations may support portable computing devices in a substantially upright position. This may make it easy for a user to insert and remove a portable computing device from a docking station and may be a safer position for the portable computing device, as compared to simply lying on a desktop or other surface where it may be more vulnerable to accidental damage.

It may also be desirable that the docking station provide a connection between a portable computing device and a computer or other accessory device. Such a connection may allow data to be transferred between the portable computing device and the computer. This data may include various media, such as music, videos, photographs, and other data. Data may be transferred from the portable computing device to the computer or from the computer to the portable computing device. Software or firmware, or software or firmware updates may be transferred between the portable computing device and the computer as well.

It may also be useful if the docking stations are able to receive power from a charger or other accessory and provide the power to charge batteries in the portable computing devices. In still other situations, it may be desirable to provide power from a portable computing device to an accessory. Also, docking stations themselves may include circuitry that may be powered from a portable computing device, accessory, or other source.

Thus, what is needed are portable computing device docking stations that may facilitate the sharing or transfer of power among a portable computing device, a docking station, and one or more accessories.

SUMMARY

Accordingly, embodiments of the present invention may provide portable computing device docking stations that may facilitate the sharing or transfer of power among a portable computing device, a docking station, and one or more accessories.

In various configurations of embodiments of the present invention, power may be provided by a portable computing device to one or both of a docking station and accessory, power may be provided by a docking station to one or both of a portable computing device and accessory, or it may be provided by the accessory to one or both of a docking station and portable computing device. For example, the accessory may be a charger that receives power from a wall or car outlet and provides power to a portable computing device via the docking station. In this example, power may be provided to the docking station by either the portable computing device or the charger accessory.

An illustrative embodiment of the present invention may provide a docking station where power may be provided by an accessory to a portable computing device. In this embodiment of the present invention, a wire, power conductor, or other conduit may be provided through the docking station from a first connector arranged to mate with the portable computing device to a second connector arranged to connect to an accessory. This docking station may also be capable of providing power from a portable computing device to an accessory. In this embodiment of the present invention, a second wire, power conductor, or other conduit may be provided through the docking station from the first connector to the second connector.

In this illustrative embodiment, a voltage received from an accessory at the second connector may appear at the first connector. When a portable computing device is not connected at the first connector, this voltage may be present at terminals of the first connector where it may be inadvertently contacted by a user or a user's property. Accordingly, another illustrative embodiment of the present invention may provide a switch or other circuitry in a power line between the second connector and the first connector. When the switch or other circuitry detects that a portable computing device is not attached to the docking station, it may open or otherwise be placed in a high-impedance state thereby either preventing a supply voltage from being present on a terminal of the first connector, or current limiting any such supply voltage such that harm is not likely to occur do to an inadvertent encounter.

Various embodiments of the present invention may provide power from a portable computing device to an accessory in various ways. For example, a docking station may directly connect an accessory to a battery of a portable computing device. In other embodiments of the present invention, this connection may be current limited or otherwise include a protective circuit. For example, a low-dropout regulator may be placed in the docking station in line between the battery of the portable computing device and the accessory. In various embodiments of the present invention, the low-dropout regulator may be driven by the battery directly or by a regulator, such as a buck-boost, shunt, or other type of regulator.

Various embodiments of the present invention may provide docking stations having internal circuits. These circuits may be powered by a portable computing device, an accessory, or by another circuit either inside or external to the docking station. An illustrative embodiment of the present invention may provide a docking station having circuits powered by a portable computing device. The power may be provided by a battery of the portable computing device through a regulator. To protect the internal circuitry from power transients caused by fault or other conditions, embodiments of the present invention may provide charge-storage capacitors at the inputs of the regulators. Disconnect diodes may be included for further protection. To reduce power consumption in the docking stations, different circuits may be powered by different regulators and these regulators may be turned off in various states.

Embodiments of the present invention may provide docking stations that may connect to accessories using different types of connector interfaces. One such connector interface is the Lightening™ connector interface. This interface is reversible. That is a Lightening inset may be interested into a Lightening receptacle in one of two orientations. Accordingly, an illustrative embodiment of the present invention may provide a docking station having a multiplexing circuit to detect an orientation of a connection to an accessory and to multiplex power and data lines appropriately.

In an illustrative embodiment of the present invention, these multiplexers may be powered by a battery in the portable computing device. For example, these multiplexers may be powered by one or more regulators having inputs that receive power from the battery in the portable computing device. But in some conditions it may be undesirable to provide power from the battery in the portable computing device. For example, when the portable computing device is receiving or providing a software or firmware update, its battery may be disconnected to avoid errors that may occur due to a fault condition, such as a short circuit in a connection to an accessory. When the battery of the portable computing device is disconnected, the multiplexers may be powered by the accessory.

An illustrative embodiment of the present invention may provide a docking station having a connector insert for mating with a receptacle on a smart phone or other portable computing device. The connector insert may be in a depression or well, the side or sides of which may provide mechanical support for an inserted smart phone or other portable computing device. The docking station may further include one or more receptacles for communicating with one or more accessories, such as storage devices, monitors, power supplies, adapters, and chargers, and other devices. In other embodiments, one or more receptacles may be replaced with dedicated or tethered cables having a connector insert at a far end. These docking station connector inserts and receptacles may mate with connector receptacles or inserts for various interfaces such as Universal Serial Bus (USB), High-Definition Multimedia Interface® (HDMI), Digital Visual Interface (DVI), power, Ethernet, DisplayPort, Thunderbolt™, Lightning™ and other types of standard and non-standard interfaces.

Various embodiments of the present invention may incorporate one or more of these and the other features described herein. A better understanding of the nature and advantages of the present invention may be gained by reference to the following detailed description and the accompanying drawings.

DESCRIPTION OF ILLUSTRATIVE EMBODIMENTS

Figure 1:
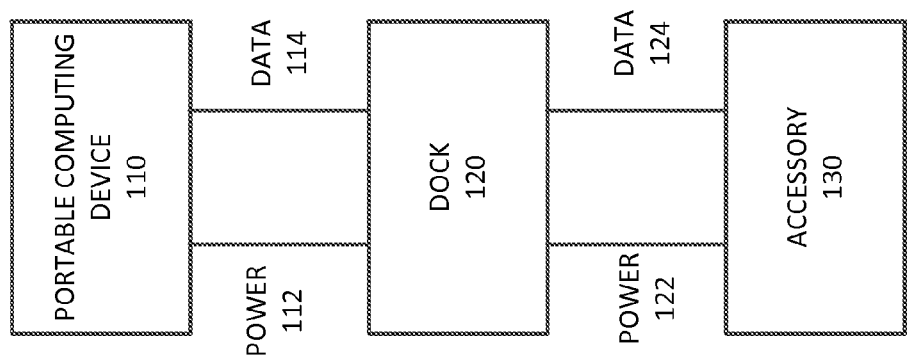
FIG. 1 illustrates an electronic system that may be improved by the incorporation of an embodiment of the present invention.

FIG. 1 illustrates an electronic system that may be improved by the incorporation of an embodiment of the present invention. This figure, as with the other included figures, is shown for illustrative purposes and does not limit either the possible embodiments of the present invention or the claims.

This figure includes portable computing device or host 110, docking station or dock 120, and accessory device or accessory 130. Docking station 120 may provide mechanical support for portable computing device 110. For example, docking station and 20 may have a connector insert that may fit into a corresponding receptacle on portable computing device 110. This insert, along with one or more other support structures, may physically support portable computing device 110 in docking station 120. In other embodiments of the present invention, portable computing device 110 may connect to docking station 120 via a cable, via a wireless connection, or combination thereof. Docking station 120 may further provide mechanical support for accessory 130. Again, docking station 120 may include a connector insert that may be fitted into a receptacle on accessory 130. In other embodiments of the present invention, docking station 120 may include a receptacle for making a connection to accessory 130 via a cable. In still other embodiments of the present invention, docking station may include a dedicated or tethered cable having an insert at a far end that may be inserted in a receptacle in an accessory. Docking station 120 may communicate with accessory 130 via one of these connections, a wireless connection, or combination thereof.

Data may be transferred between docking station 120 and portable computing device 110 via lines 114. Lines 114, as with the other lines shown, may be wired or wireless connections. Similarly, docking station 120 may communicate with accessory 130 via data lines 124. Accessory 130 may communicate through docking station 120 to portable computing device 110 using lines 124 and 114.

Power may be shared among portable computing device 110, docking station 120, and accessory 130 via lines 112 and 122, which again may be wired or wireless connections. For example, portable computing device 110 may include a battery that may provide power to docking station 120 and accessory 130 via lines 112 and 122. Docking station 120 may include or receive power, which may be provided to portable computing device 110 over line 112 and to accessory 130 over line 122. Similarly, accessory 130 may include or receive power, which it may provide to docking station 120 via line 122 and to portable computing device 110 via lines 122 and 112. Power may be transferred between and among portable computing device 110, docking station 120, and one or more accessories 130 using power conductors or other wired connections. Power may also be transferred between devices using wireless paths, for example by using inductive or capacitive charging. In one specific embodiment of the present invention, docking station 120 may provide power to portable computing device 110 by inductive or capacitive charging. In another specific embodiment of the present invention, docking station 120 may provide power to accessory 130 using inductive or capacitive charging, while in another, accessory 130 may provide power to docking station 120 in a wireless manner.

While in this example, docking station 120 is shown as communicating with one accessory 130, in other embodiments of the present invention, docking station 120 may be configured to communicate with two or more accessories. Also, accessories 130 may be daisy-chained to communicate with one or more other accessories, which are not shown for simplicity.

In various embodiments of the present invention, portable computing device 110 may be a smart phone, portable media player, laptop computer, tablet computer, navigational device, a wearable computing device such as a bracelet or pendant, piece of clothing, or the like, or other portable computing device. Accessory 130 may be a charger that receives power from a wall or car outlet, speakers, computer, tablet, storage device, projector, camera, monitor, power supply, adapter, or other device.

Again, embodiments of the present invention may provide docking stations that provide mechanical support for a portable computing device. For example, a docking station may include an insert that may be received by a receptacle on portable computing device. The docking station may further include one or more receptacles or dedicated cables which may be used to connect to one or more accessories. These docking stations may include one or more other features such as control buttons, displays, or other features. An example is shown in the following figure.

Figure 2:
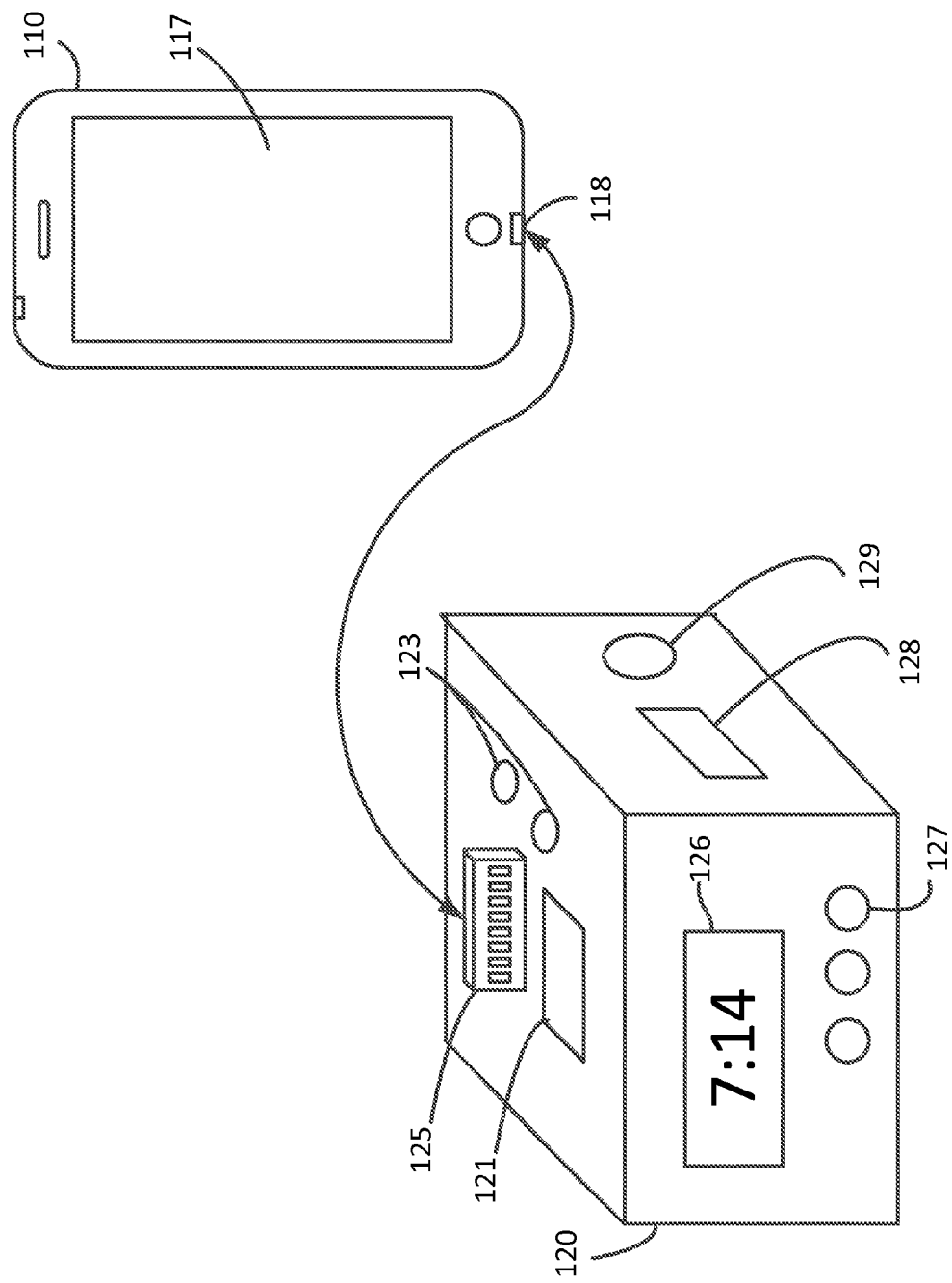
FIG. 2 illustrates a docking station according to an embodiment of the present invention.

FIG. 2 illustrates a docking station according to an embodiment of the present invention. Docking station 120 may include connector insert 125 for mating with receptacle 118 on smart phone or other portable computing device 110. Connector insert 125 may be located in a depression or well (not shown) that may provide mechanical support for smart phone or other portable computing device 110. Connector insert 125 may include a number of contacts to form power and signal paths with corresponding contacts in connector receptacle 118. Docking station 120 may further include one or more receptacles 128 and 129 for communicating with one or more accessories. In a specific embodiment of the present invention, receptacle 128 may be a lightning receptacle, while receptacle 129 may be a headphone jack.

Connector insert 125 may include contacts on one or more sides. Smart phone 110 may typically have contacts only on one side of receptacle 118 in order to save space and to allow smart phone 110 to be thinner. Having contacts on two sides of connector insert 125 may allow smart phone 110 to be inserted in either of two ways in dock station 120. To simplify dock station 120, contacts may be removed or omitted on one side of connector insert 125. In such an embodiment, smart phone 110 may be inserted only one way on dock station 120. Docking station 120 may be shaped or formed such that smart phone or other portable computing device 110 may fit over connector insert 125 in the one proper orientation to avoid consumer confusion.

Docking station 120 may include various additional components such as light-emitting diodes (LEDs), buttons, touch pads, displays, wireless communication devices, and other types of components.

For example, light-emitting diodes 123 may be used to indicate a charging status of a battery in a portable computing device 110. A multi-colored LED may turn a first color to indicate that a charge is occurring and a second color to indicate that charging is complete. Light-emitting diodes may also be used in conjunction with proximity sensors. Specifically, an LED may light when motion near connector insert 125 is detected. This illumination may assist a user in attaching portable computing device 110 to docking station 120, or it may assist a user in finding buttons, touch pads, or other controls on the docking station. Light-emitting diodes may also be used to indicate status settings, such as do-not-disturb, airplane mode, and alarm status settings.

Touch pads 121 or buttons 127 may be used to control playback volume through an audio channel. Touch pads 121 or buttons 127 may be used for snooze or mode select functions, such as to put a portable computing device into a do-not-disturb or airplane mode.

Display 126 may be used to indicate time, mode of the device, weather, news, or other data. This data may be retrieved from an accessory or from portable computer device 110. Display 126 may be used to indicate an alarm or snooze setting, do-not-disturb or airplane settings, and other types of modes and settings.

Wireless communications devices (not shown) may be included in docking station 120 and used as remote controls for devices such as coffee makers, thermostats, lighting, and other types of devices. The wireless communication devices may also connect to cellular or Wi-Fi networks to retrieve, provide, or synchronize data.

Docking station 120 may also include gesture detection. Gesture detection may allow a user to interact with docking station 120 by simply making hand movements in the proximity of docking station 120. For example, a wave of a hand over docking station 120 may put an alarm in a snooze state. A gesture may be used to turn on a display, either on portable computing device 110 or docking station 120, to show time, date, weather, news, or other information or combination thereof. When viewing news on display 126, a gesture may be used to advance text to a next page. Other docking stations may include other features consistent with embodiments of the present invention.

Again, embodiments of the present invention may provide docking stations that facilitate power transfer from an accessory to a portable computing device and from a portable computing device to an accessory. An example is shown in the following figure.

Figure 3:
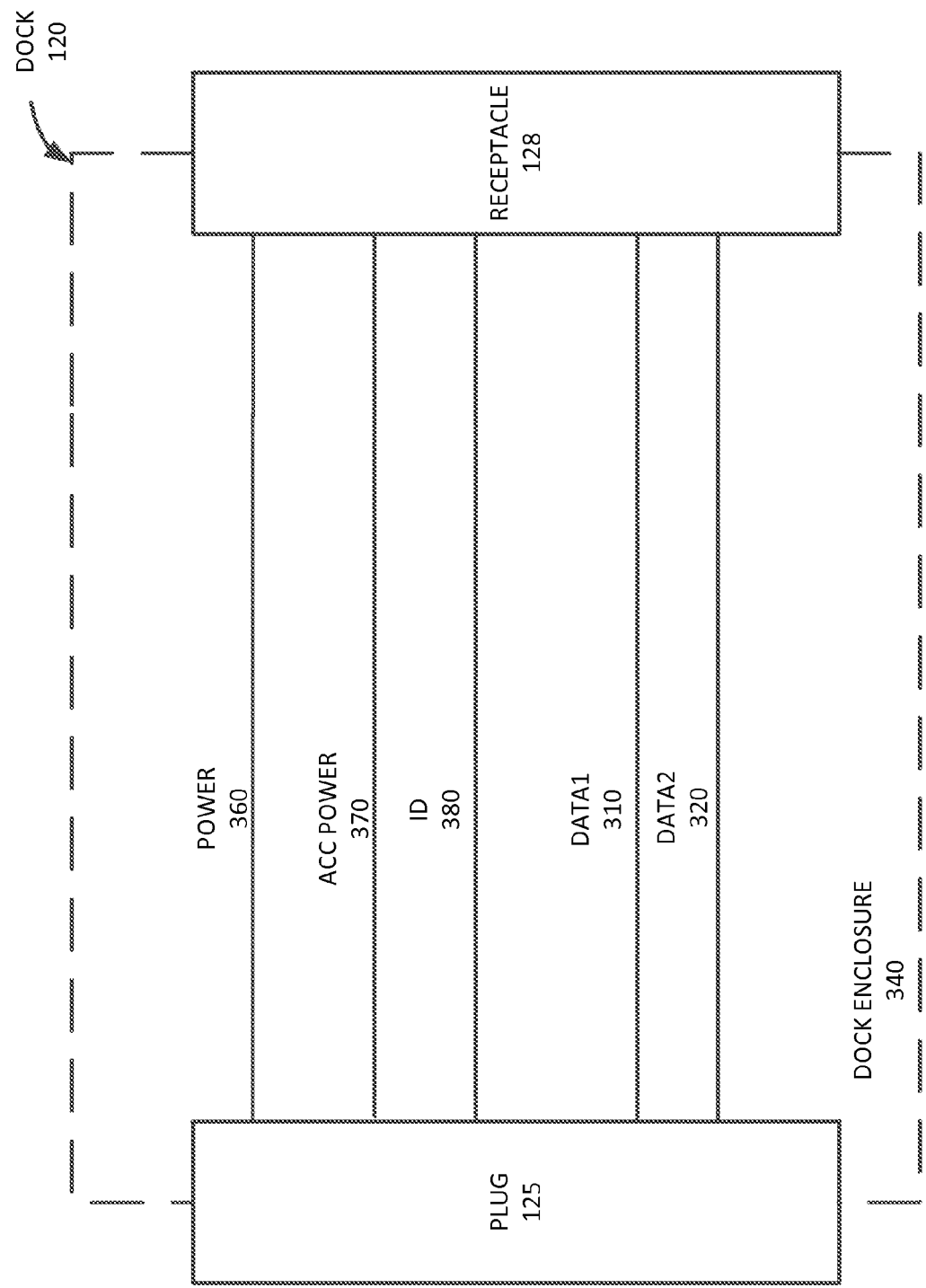
FIG. 3 illustrates a docking station according to an embodiment of the present invention.

FIG. 3 illustrates a docking station according to an embodiment of the present invention. Docking station 120 may be housed in docking enclosure 340. Docking enclosure 340 may include connector insert or plug 125 and receptacle 128. Two communication paths, DATA1 310 and DATA2 320 may connect to contacts in plug 125 and contacts in receptacle 128. Data paths DATA1 310 and DATA2 320 may be single-ended or differential signal paths.

Other data, control, and power lines may be connected between plug 125 and receptacle 128. One such control line may be an ID line 380. ID line 380 may be used by an accessory connected to receptacle 128 to provide authentication and identification information to a portable computing device connected to plug 125. More information on these and other data and identification lines and related circuitry that may be included in embodiments of the present invention may be found in co-pending U.S. patent application Ser. No. 14/022,015, filed Sep. 9, 2013, titled DOCKING STATION WITH AUDIO OUTPUT, which is incorporated by reference.

Power on line 360, ACC power on line 370, as well as ground or other power or bias lines (not shown) may be provided between plug 125 and receptacle 128. Specifically, power may be provided from an accessory 130 over power line 360 to a portable computing device 110, or power may be provided from the portable computing device 110 over ACC power line 370 to an accessory 130.

In various embodiments of the present invention, receptacle 128 may accept different types of connector inserts. Some of these inserts may be unidirectional, that is, a connector insert may be inserted into receptacle 128 in only one orientation. Examples of this type of connector include USB, HDMI, DVI, and Thunderbolt connectors. Each of the various docking stations shown in these examples may utilize this type of connector to communicate with an accessory.

Other connector inserts may be bidirectional. That is, a connector insert may be inserted into receptacle 128 in at least two orientations. An example of this type of connector is the Lightening connector. A Lightening connector may include eight contacts, where an order of signals, power, and communications signals may be one way if a connector insert is inserted into receptacle 128 with a first polarity, and the order may be reversed if the connector inserted is inserted into receptacle 128 with a second or reversed polarity. Accordingly, circuitry associated with receptacle 128 may be used to detect a connector insert orientation and reverse the signal order if a connector insert is inserted into receptacle 128 with the second or reversed polarity. Details of how this reversal may be accomplished may be found in co-pending U.S. patent application Ser. No. 13/607,550, filed Dec. 7, 2012, titled TECHNIQUES FOR CONFIGURING CONTACTS OF A CONNECTOR, which is incorporated by reference. Some of the various docking stations herein or otherwise consistent with embodiments of the present invention may operate with this type of connector correctly if the portable computing device includes circuitry to adjust the order of the received signals, control lines, and power supplies. Other examples include docking stations that include circuits such that the docking station may operate with this type of connector, regardless of the capability of the portable computing device.

It should also be noted that some embodiments of the present invention may utilize a modified Lightening connector where the Lightening connector is unidirectional and can only be inserted into receptacle 128 in one orientation. This may occur where a modified Lightening connector having contacts only on one side of an insert is used. To avoid confusion, this orientation may be indicated on the connector insert, for example with a symbol. This modified connector may operate with each of the docking stations in these examples. The docking station in this specific example may operate with a unidirectional connector and a Lightening or other bidirectional connector as receptacle 128 if the portable computing device includes circuitry to adjust the order of the received signals, control lines, and power supplies.

Similarly, plug 125 mat be a unidirectional or bidirectional connector insert. For example, plug 125 may be a unidirectional USB, HDMI, DVI, or Thunderbolt connector, or a bidirectional connector such as a Lightening connector.

While in these examples a connection to a portable computing device is shown as plug 125 and a connection to an accessory is shown as receptacle 128, in other embodiments of the present invention plug 125 may be replaced by a receptacle and receptacle 128 may be replaced by a plug, such as a plug connected to docking station 120 via a cable.

In the above example, POWER 360 and other bias lines may be coupled between plug 125 and receptacle 128. But this may cause voltages to be present on exposed contacts on plug 125 when a portable computing device is not attached to docking station 120. Accordingly, embodiments of the present invention may provide one or more switches, relays, variable resistances, or other mechanism to avoid exposing such voltages where they may be inadvertently contacted by a user or the user's property. An example is shown in the following figure.

Figure 4:
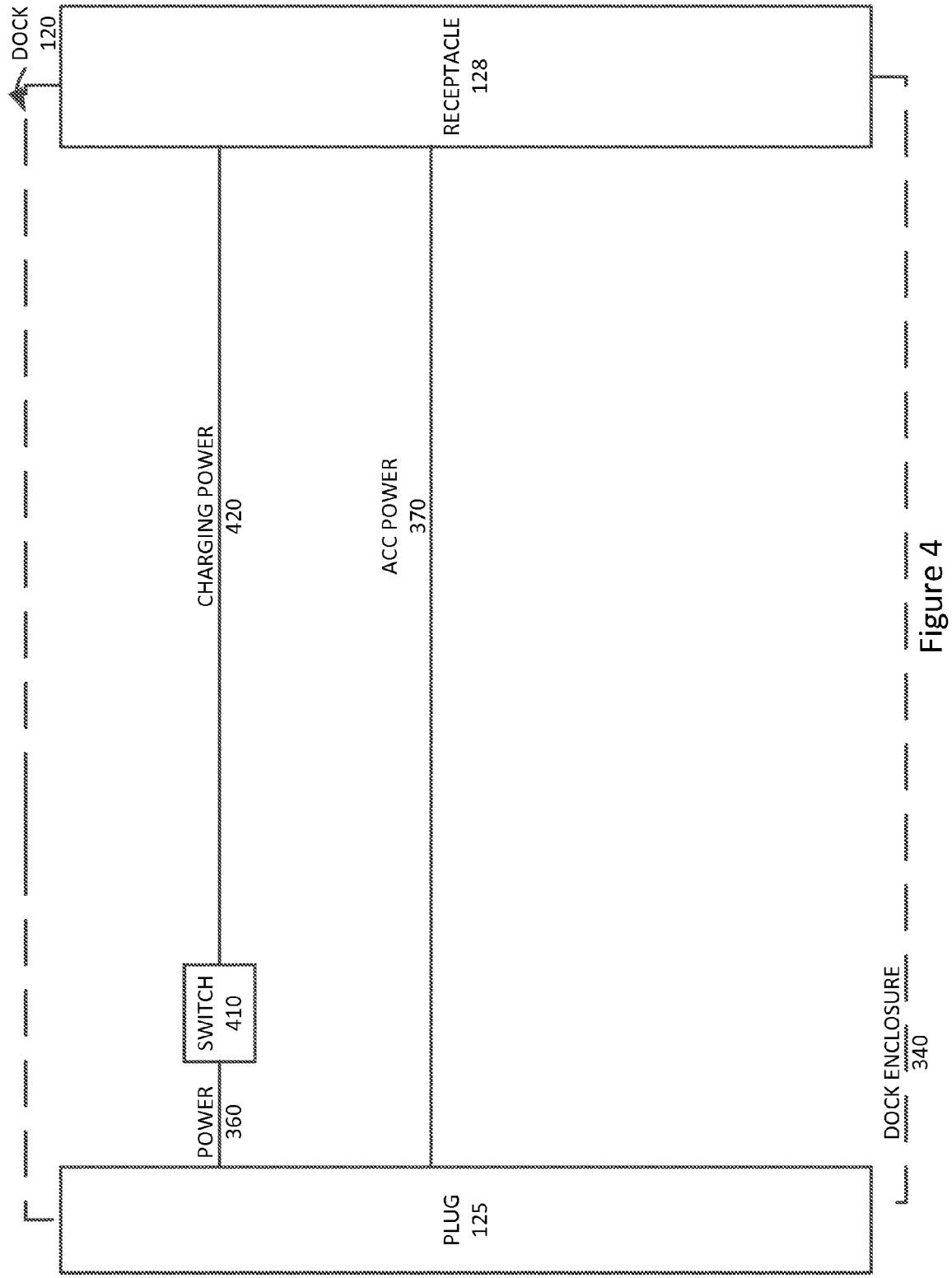
FIG. 4 illustrates a docking station having a power switch according to an embodiment of the present invention.

FIG. 4 illustrates a docking station having a power switch according to an embodiment of the present invention. In this example, power switch 410 may be included. In this and the following examples, lines such as data and identification lines are omitted for clarity. Power switch 410 may receive power from an accessory on line 420, such as a charger, via receptacle 128. Power switch 410 may detect or be informed whether a portable computing device 110 is attached at plug 125. If no portable computing device 110 is attached at plug 125, power switch 410 may be in an open or high-impedance state, thereby protecting a user from inadvertent contact with a voltage on an exposed contact on plug 125. Power switch 410 may provide protection by being open, such that no voltage is present at plug 125. Power switch 410 may also be in a sufficiently high-impedance state such that a voltage at plug 125 is current limited enough that harm from an inadvertent encounter is not likely. When a portable computing device 110 is attached at plug 125, power switch 410 may be in a closed or low-impedance state, and power may be provided by accessory 130 onto line 420, through power switch 410 and power line 360 to plug 125, where it may be received by portable computing device 110.

In a specific embodiment of the present invention, power switch 410 may include circuitry to sense an impedance at a pin at plug 125 in order to determine that portable computing device 110 is attached at plug 125, though this determination may be made by power switch 410 in other ways. In other embodiments of the present invention, other circuits may detect that computing device 110 is attached at plug 125 by looking for a connection to ground at one pin, or by using another method. This other circuit may then inform power switch 410 that computing device 110 is attached at plug 125. In still other embodiments of the present invention, power switch 410 may itself have this capability.

In the above examples, power may be provided directly from portable computing device 110 to accessory 130. In other embodiments of the present invention, this direction connection may be absent or limited to a number of situations. An example is shown in the following figure.

Figure 5:
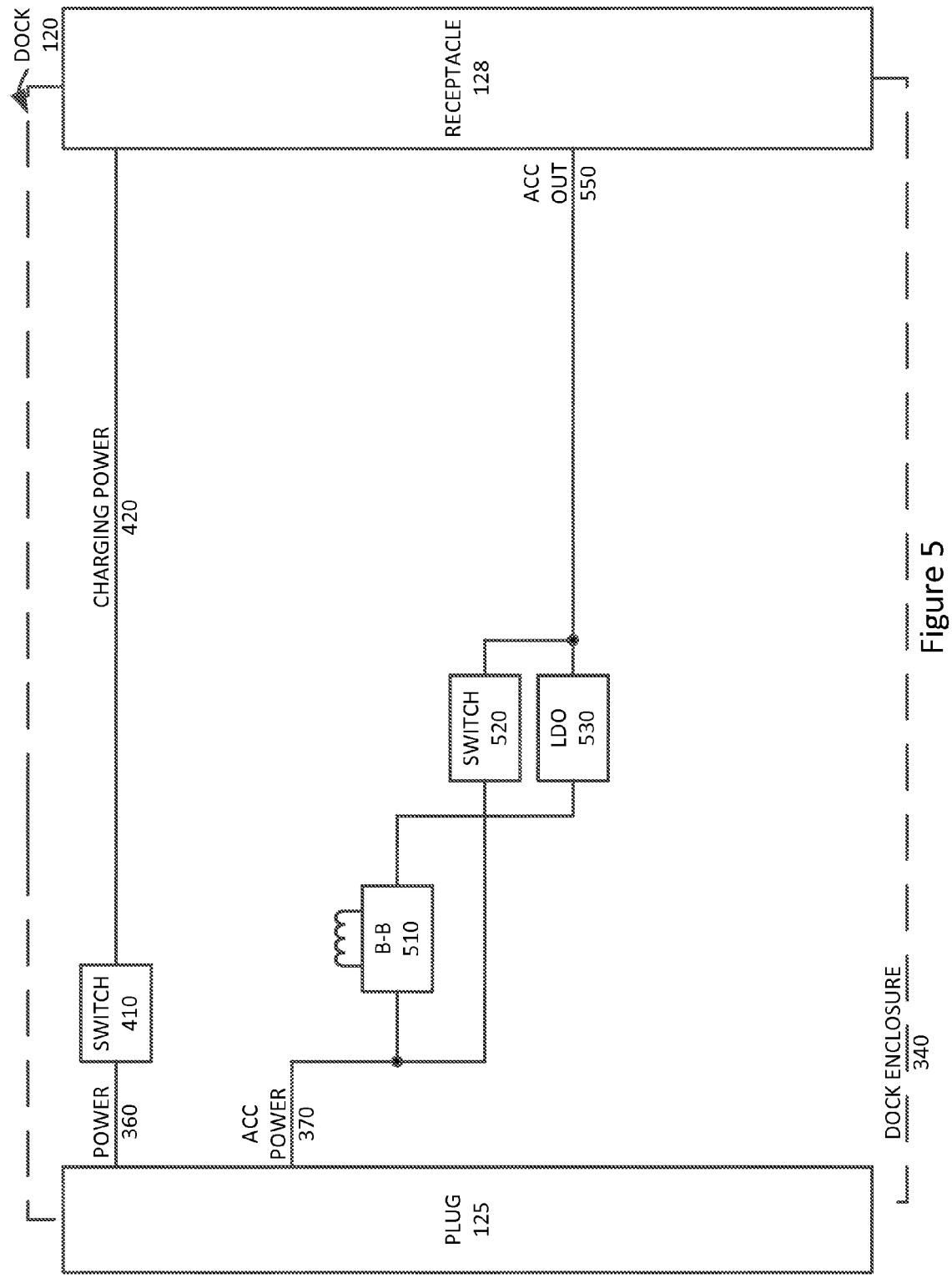
FIG. 5 illustrates a docking station capable of providing power in different configurations to different accessories according to an embodiment of the present invention.

FIG. 5 illustrates a docking station capable of providing power in different configurations to different accessories according to an embodiment of the present invention. In this example, power may be provided by docking station 120 to accessory 130 in two different configurations. In a first configuration, switch 520 may be closed and low-dropout regulator 530 may be disabled. ACC power received on line 370 from portable computing device 110 via plug 125 may be passed through switch 520 to line ACC OUT 550. Power on line ACC OUT 550 may be provided through receptacle 128 to accessory 130.

In this configuration, accessory 130 may have direct access to a battery on portable computing device 110. Unfortunately, accessories, such as accessory 130, may occasionally create a fault condition, such as a power supply short. Accordingly, switch 520 may be current limited or contain other protections for the battery in portable computing device 110.

In various embodiments of the present invention, this direct or near direct access may be limited to specific accessories 130. For example, specific types of accessories may be granted access to a battery in portable computing device 110 via switch 520, or access may be limited to accessories that have undergone certain testing or qualifications. In other embodiments of the present invention, accessories manufactured by specific vendors or suppliers may have access to a battery in portable computing devices 110 via switch 520, while in other embodiments of the present invention, this access may be granted to accessories using other criterion or criteria.

When direct access to the battery in portable computing device 110 is desired to be further limited, a second configuration may be included in docking station 120. In this example, low-dropout regulator 530 may be included. When accessory 130 does not meet the specified criterion or criteria, power may be provided to the accessory on line ACC OUT 550 by low-dropout regulator 530. Low-dropout regulator 530 may have an input connected directly through line ACC POWER 370 to a battery in portable computing device 110. In other embodiments of the present invention, a regulator, such as buck-boost regulator 510, may be provided such that low-dropout regulator 530 may have a well-regulated input voltage.

In this way, power in one of two configurations may be provided to accessory, though other configurations may be included as well. Also, various embodiments of the present invention may employ one or the other above configurations for all accessories, and may not include the unused configuration. Trusted accessories may receive a direct or near direct connection to a battery in portable computing device 110. This may allow a trusted accessory to have access to a great deal of power for fast charging or other high power applications. Other accessories may be limited to the power that low-dropout regulator 530 may provide. However, this lower power output may have improved voltage regulation due to the inclusion of a regulator, such as buck-boost regulator 510, and the additional regulation provided by low-dropout regulator 530. In other embodiments of the present invention, buck-boost regulator 510 may be another type of regulator, such as a shunt regulator, while low-dropout regulator 530 may be another type of DC-to-DC converter or regulator.

Embodiments of the present invention may provide docking stations that may include various circuits. In these embodiments, docking station circuits may be powered either from portable computing device 110, accessory 130, or by other circuitry other internal or external to docking station 120. An example is shown in the following figure.

Figure 6:
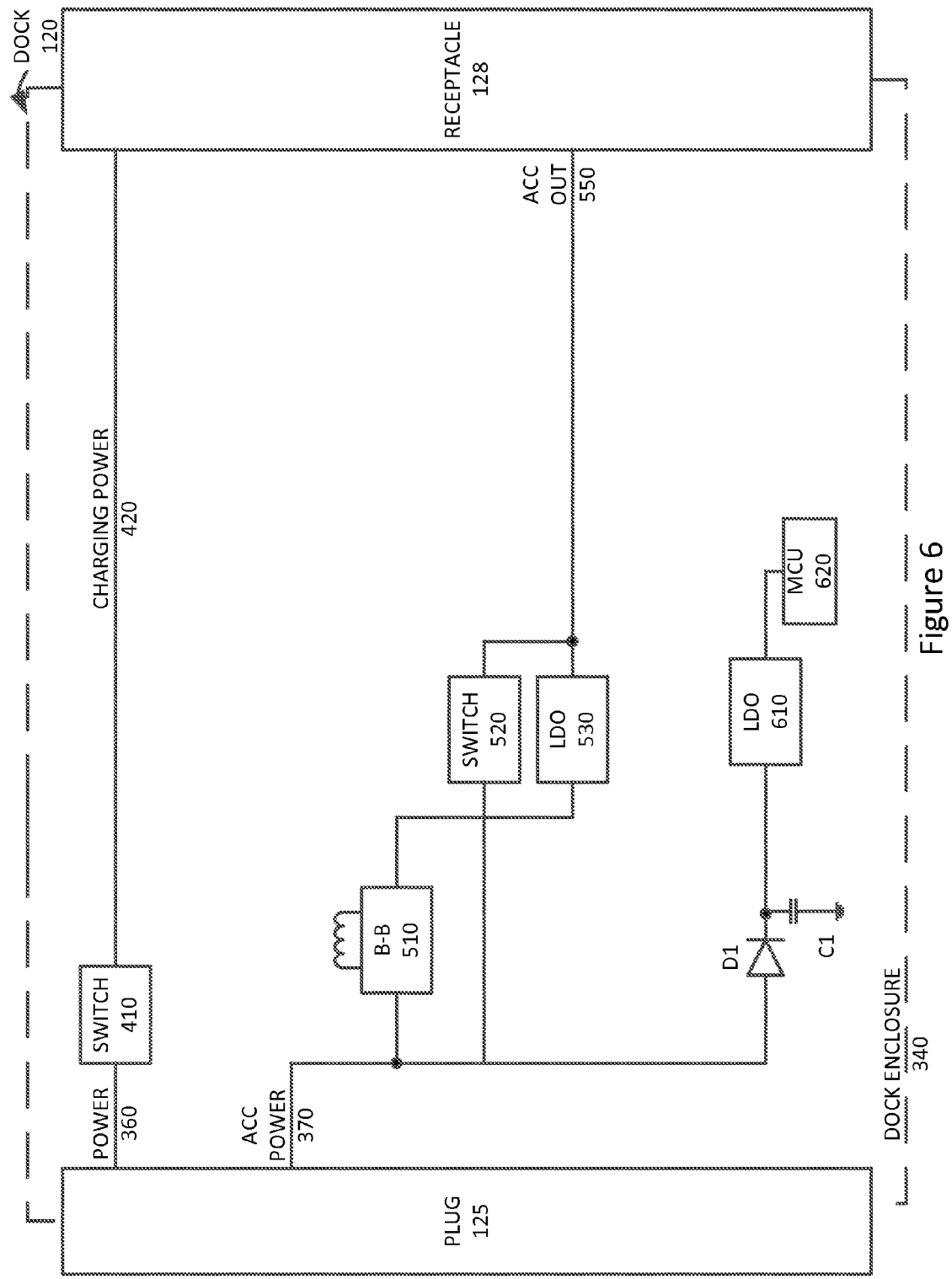
FIG. 6 illustrates a docking station including internal circuitry according to an embodiment of the present invention.

FIG. 6 illustrates a docking station including internal circuitry according to an embodiment of the present invention. This example includes a microprocessor or microcontroller 620. Microprocessor 620 may be powered by low-dropout regulator 610. Low-dropout regulator 610 may receive its power from portable computing device 110 via plug 125 and line ACC POWER 370, though in other embodiments of the present invention, low-dropout regulator 610 may receive power from line charging power on line 420, or from a power circuit that is internal or external to docking station 120. For example, docking station 120 may include transformers, capacitors, and other components needed to convert AC power to DC power that may be provided to circuits in and associated with docking station 120. While regulator 610 is shown in this example as a low-dropout regulator, in other embodiments of the present invention low-dropout regulator 610, as with the other included low-dropout regulators, may be other types of DC-to-DC converters or regulators.

Again, accessory 130 may create a fault condition on line ACC OUT 550, or another fault condition may occur. This fault condition may cause the voltage on line ACC POWER 370 to drop. Such a drop may erase or reset the contents of microprocessor 620. To keep this from happening, embodiments the present invention may provide charge capacitors to maintain an input voltage at regulators or other circuits during such a transient fault condition. In this example, capacitor C1 may be included at an input of low-dropout regulator 610. Disconnect diode D1 may provide a high-impedance path back into ACC POWER 370 when a fault condition occurs, thereby maintaining a charge on capacitor C1.

In various embodiments of the present invention, other circuitry may be included in docking station 120. Such circuits may be powered by low-dropout regulator 610, or they may be powered by other regulating circuits.

In various embodiments of the present invention, various circuits may be disabled when they are not being used in order to save power. Accordingly, various regulators may be disabled, thereby removing power from their associated circuits. Also, these regulators may be powered by various sources, such as a battery in portable computing device 110 via ACC POWER 370, or by another regulator, such as buck-boost regulator 510. An example is shown in the following figure.

Figure 7:
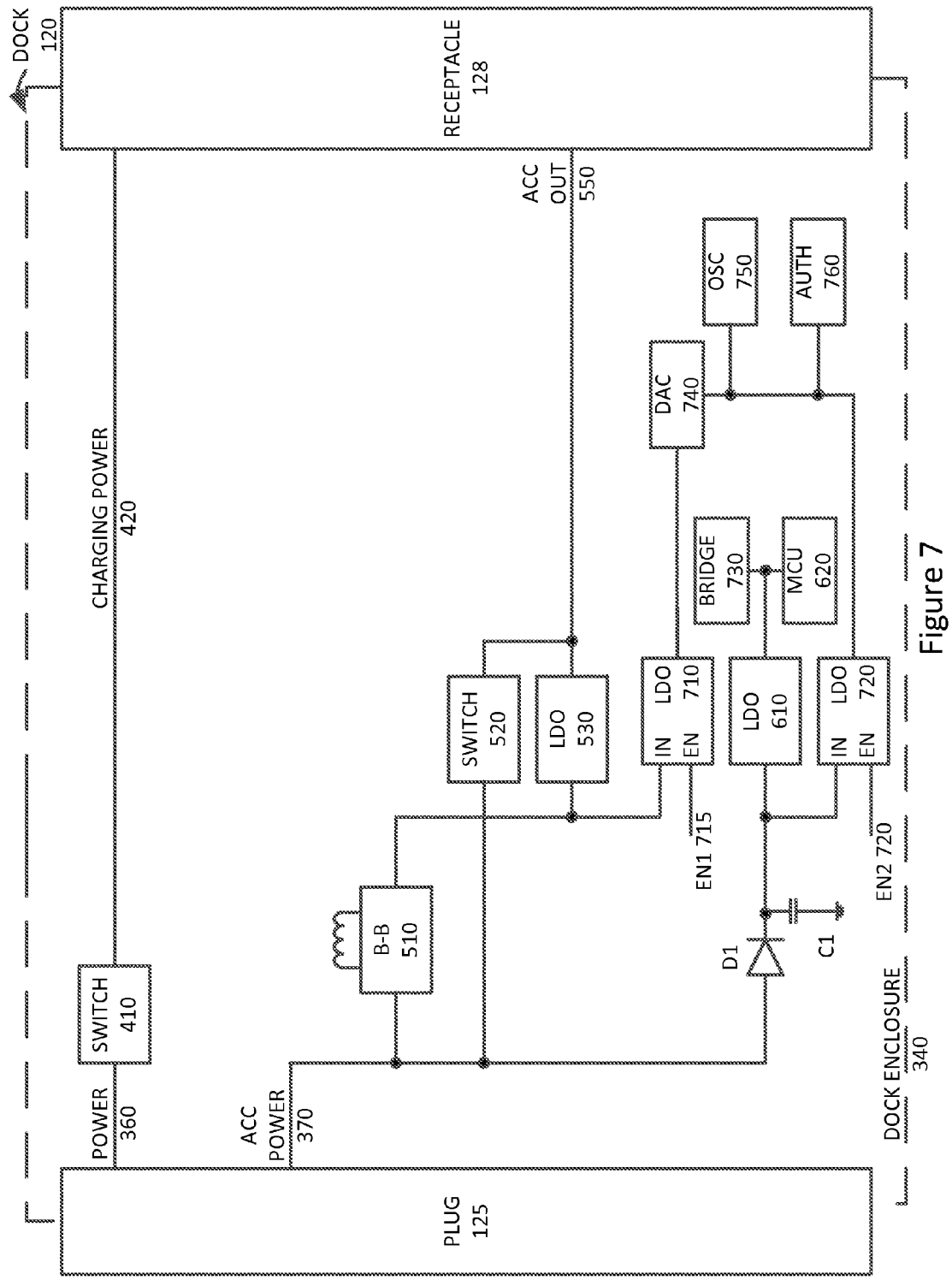
FIG. 7 illustrates a docking station including additional circuitry according to an embodiment of the present invention.

FIG. 7 illustrates a docking station including additional circuitry according to an embodiment of the present invention. In this example, bridge circuit 730, digital-to-analog converter 740, audio oscillator 750, and authentication circuit 760 may be included. On occasion, these various circuits may not be needed. For example, once docking station 120 is authenticated to portable computing device 110, authentication circuit 760 may be shut off. Accordingly, low-dropout regulator 720, which powers authentication circuit 760, may be disabled by a signal on EN2 720. Similarly, when no audio signal is being generated, at least part of digital-to-analog converter 740 may be shut off by disabling low-dropout regulator 720 using signal EN1 715.

In this example, low-dropout regulator 710 may power digital-to-analog converter 740. Digital-to-analog converter 740 may be used in docking station 120 to generate an audio signal. Since the quality of an audio signal is important, low-dropout regulator 710 may be powered by buck-boost regulator 510. The cleaner supply voltage provided by buck-boost regulator 510 may help to improve audio quality provided by docking station 120. Further examples of the functions performed by microprocessor 620, bridge 730, digital to analog converter 740, oscillator 750, authentication circuit 760, and other circuits (not shown), may be found in co-pending U.S. patent application Ser. No. 14/022,015, filed Sep. 9, 2013, titled DOCKING STATION WITH AUDIO OUTPUT, which is incorporated by reference.

Embodiments of the present invention may communicate with one or more accessories and portable computing devices using different types of connector interfaces. One such interface is the Lightning connector interface. Lightning connectors are reversible. That is, a Lightning connector insert may be inserted into a Lightening receptacle in one of two orientations. Accordingly, embodiments of the present invention may include a number of multiplexers to multiplex signals received from an accessory. An example of a Lightning connector insert is shown in the following figure.

Figure 8:
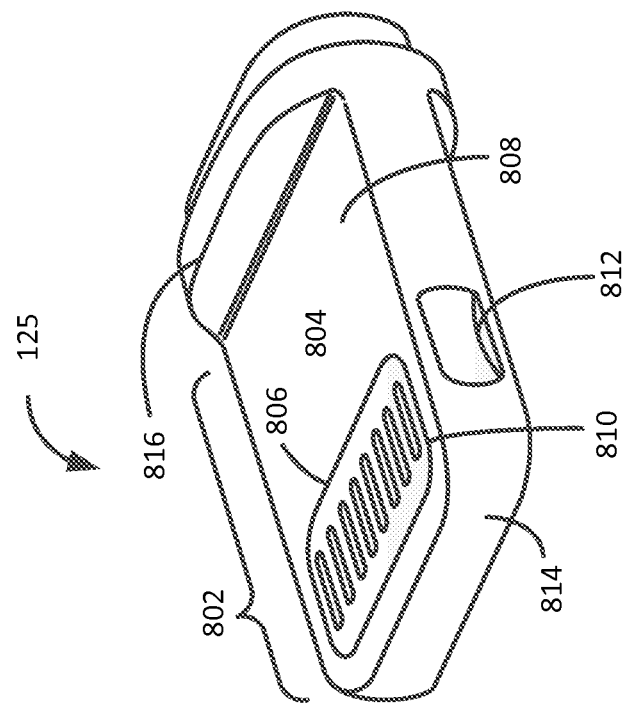
FIG. 8 illustrates a Lightning connector insert that may be employed and received by embodiments the present invention.

FIG. 8 illustrates a Lightning connector insert that may be employed and received by embodiments the present invention. Specifically, this connector may be used as connector 125 on docking station 120. It may also be used as a plug attached to a cable to replace receptacle 128 as a way to connect to an accessory. This connector may also be received at receptacle 128 in some of the examples shown herein.

Connector insert 125 may include insert portion or tab 802. Tab 802 may be sized to be inserted into a corresponding receptacle connector during a mating event and may include a first contact region 806 formed on a first major surface 804 and a second contact region (not shown) formed at a second major surface (also not shown) opposite surface 804. Surface 804 may extend from a distal tip 814 of tab 802 to spine 816 that, when tab 802 is inserted into a corresponding receptacle connector, abuts a housing of the receptacle connector or portable computing device that the receptacle connector is incorporated in. Tab 802 may also include first and second opposing side surfaces that extend between the first and second major surfaces including 804.

A plurality of contacts 810 can be formed in each of contact regions 806 on each side of tab 802 such that, when tab 802 is inserted into a corresponding receptacle connector, contacts 806 are electrically coupled to corresponding contacts in the receptacle connector. In some embodiments, contacts 806 are self-cleaning wiping contacts that, after initially coming into contact with a receptacle connector contact during a mating event, slide further past the receptacle connector contact with a wiping motion before reaching a final, desired contact position.

The structure and shape of tab 802 may be defined by a ground ring 808 that can be made from stainless steel or another hard conductive material. Connector 125 may include retention feature 812 and a corresponding feature on the opposite side of tab 802 formed as curved pockets in the sides of ground ring 808 that may double as ground contacts.

Various embodiments of the present invention may utilize this or other types of connectors as plug 125 on docking station 120, as plug 544 to connect to an accessory, or to be accepted at receptacle 128 by docking station 120. The numbers pins or contacts and pins assignments may vary as well. Specific pinouts that may be used for these plugs and receptacles can be found in co-pending U.S. patent application Ser. No. 13/607,366, filed Sep. 7, 2012, titled DUAL ORIENTATION ELECTRONIC CONNECTOR, which is incorporated by reference.

Again, this connector may be used as connector 125 on docking station 120. It may also be used as plug 544 attached to cable 542 in the tethered cable examples shown herein. This connector may also be received at receptacle 128 in the following figures. (It may also be received in the examples above, but care should be taken to ensure that only an insertion that does not require an inversion or reversal is made. This may be accomplished, for example, by using a cable having a marking to indicate a desirable orientation.)

Again, using these connectors in a docking station with a multiplexing circuit may allow a connector to be inserted in either of at least two orientations in receptacle 128. As with microprocessor 620 and other circuits described above, these multiplexers may be powered by either portable computing device 110, accessory 130, or by other circuitry associated with docking station 120. An example is shown in the following figure.

Figure 9:
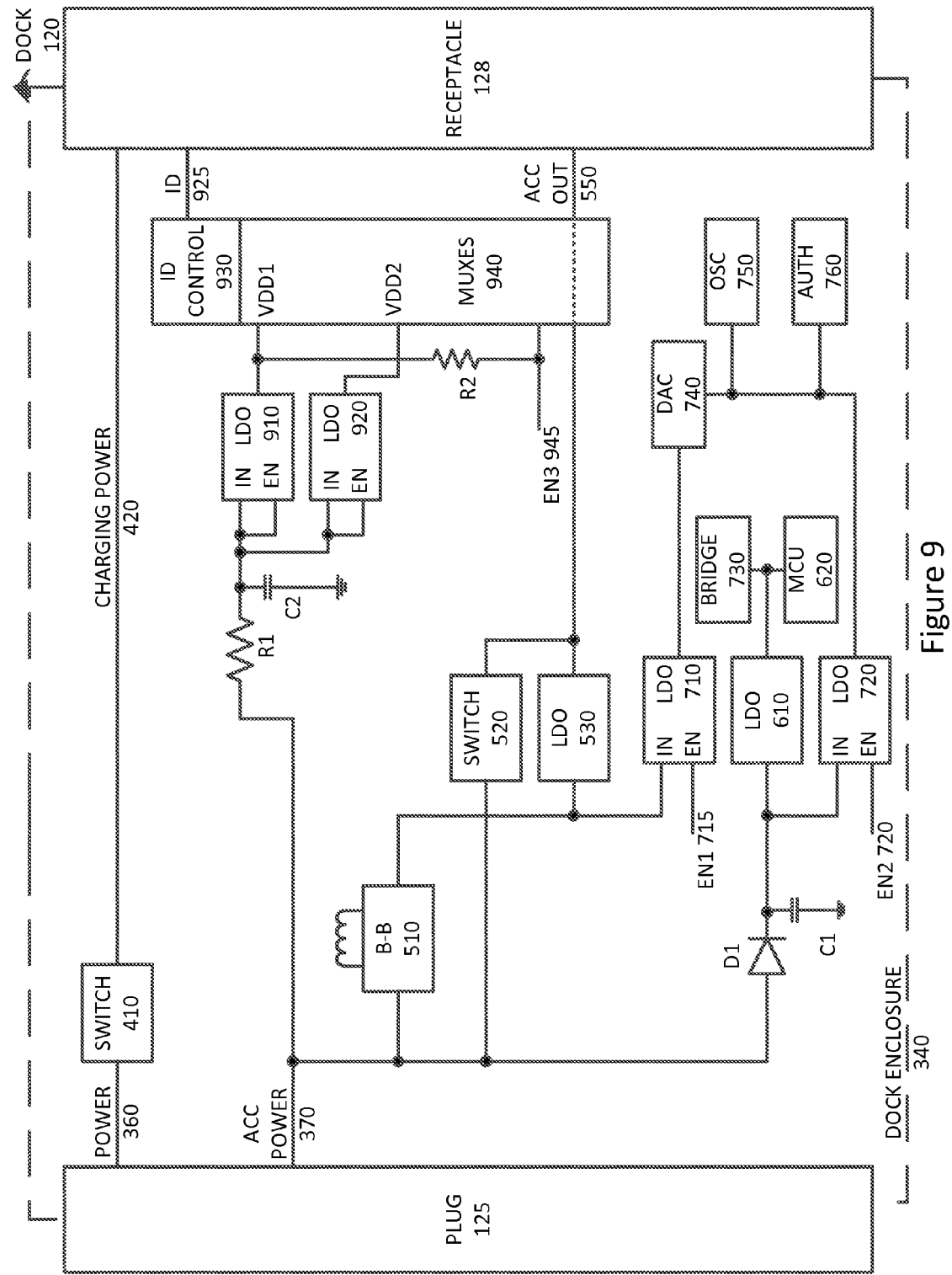
FIG. 9 illustrates a docking station including multiplexers and an associated power circuit according to an embodiment of the present invention.

FIG. 9 illustrates a docking station including multiplexers and an associated power circuit according to an embodiment of the present invention. In this example, multiplexers 940 are included. Again, these multiplexers may enable the use of a reversible connector at receptacle 128. In other embodiments of the present invention, receptacle 128 may be replaced by a cable and a plug that is reversible.

Multiplexers 940 may be powered by low-dropout regulators 910 and 920. These low-dropout regulators may provide different voltages to different parts of multiplexers 940. Low-dropout regulators 910 and 920 may receive power from portable computing devices 110 via plug 125 and ACC POWER 370. Resistor R1 and capacitor C2 may help smooth noise and transients caused by fault conditions, such as power supply shorts on line ACC OUT 550. Multiplexers 940 may be disabled using line EN3 945. Specifically, an open drain device may be connected to line EN3 945. When this open drain device is active, current may flow through resistor R2, pulling EN3 945 to ground.

In this example, multiplexers 940 may receive a supply voltage at input VDD2 from low-dropout regulator 920. Low-dropout regulator 920 may be powered by a voltage on line ACC power 370. This voltage, which may be provided by a battery in portable computing device 110, may be insufficient to provide a desirable voltage on line VDD2. Accordingly, embodiments of the present invention may provide a second regulator to provide sufficient voltage when a first regulator powered by a battery in portable computing device 110 is unable. An example is shown in the following figure.

Figure 10:
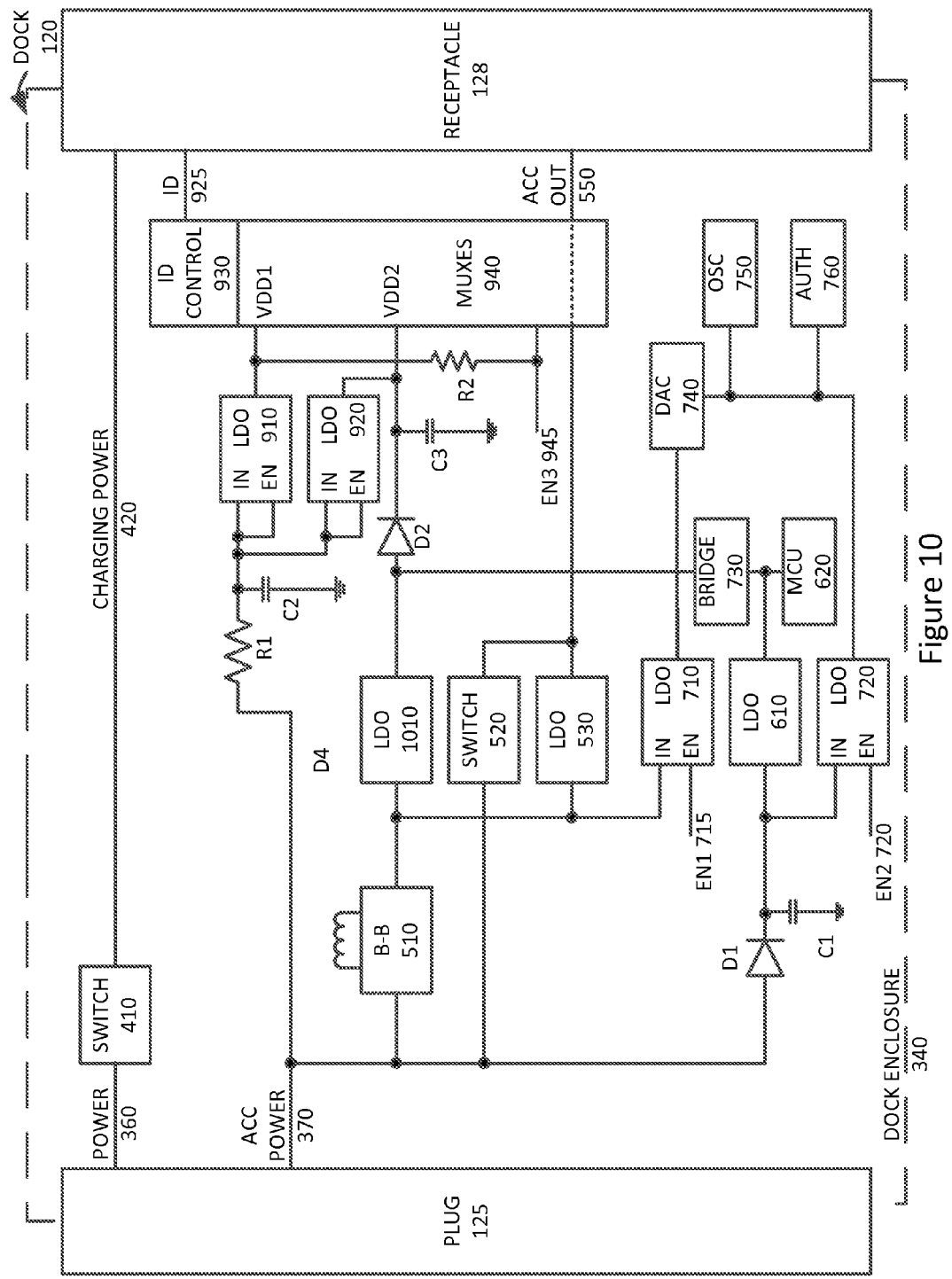
FIG. 10 illustrates a docking station according to an embodiment of the present invention.

FIG. 10 illustrates a docking station according to an embodiment of the present invention. In this example, low-dropout regulator 1010 has been added. Low-dropout regulator 1010 may be driven by buck-boost regulator 510. Buck-boost regulator 510 may provide sufficient voltage to low-dropout regulator 1010 such that it may in turn provide sufficient voltage to multiplexing circuitry 940 on line VDD2 even when the voltage on line ACC POWER 370 is insufficient.

Specifically, buck-boost regulator 510 may boost voltage received on ACC POWER 370. This boosted voltage may be regulated by low-dropout regulator 1010. Disconnect diode D2 may couple low-dropout regulator 1010 to voltage terminal VDD2 when the output of low-dropout regulator 1010 is higher than the output of low-dropout regulator 910. Accordingly, when a voltage on line ACC POWER 370 is low, such that the output of low-dropout regulator 920 is low, the output of low-dropout regulator 1010 may provide a sufficient voltage to input VDD2 to a multiplexing circuit 940 via diode D2.

In various embodiments of the present invention, diodes, such as diode D1, D2, D3, and D4, may be Schottky diodes, though in other embodiments of the present invention they may be other types of diodes. These diodes may provide a voltage drop on the order of opening 0.3 Volts. That is, a voltage received at input VDD2 to multiplexing circuit 940 may be 0.3 Volts lower than a voltage provided at the output of low-dropout regulator 1010. Also, a various embodiments of the present invention, each of the various included regulators may provide a fixed nominal output voltage. This fixed nominal output voltage may be different for different regulators, though different regulators may share the same nominal output voltage. For example, they may have output voltages that are one of 1.8 Volts, 3.1 Volts, 3.3 Volts, 3.6 Volts, or other voltages. In a various embodiments of the present invention, regulators 610, 720, and 910 may nominally provide one of 1.8 Volts, 3.1 Volts, or 3.3 Volts, regulator 710 may provide one of 1.8 Volts, 3.1 Volts, or 3.3 Volts, while regulators 530, 920, and 1010 may provide one of 1.8 Volts, 3.1 Volts, or 3.3 Volts. In various embodiments of the present invention, Buck-Boost regulator 510 may provide one of 3.1 Volts, 3.3 Volts, or 3.6 Volts. In still other embodiments of the present invention, these and other regulators may provide different voltages. These fixed output voltages may have different tolerances.

In various embodiments of the present invention, software and firmware updates and other data transfers may be provided by a computer connected as accessory 130 to portable computing device 110 via a docking station 120. Again, various fault conditions may cause the voltage on line ACC POWER 370 to dip considerably, at least in a transient manner. Since ACC POWER 370 may be directly connected to a battery in portable computing device 110, such a fault conditions may also cause supply voltages in portable computing device 110 to drop in a transient manner. This may be particularly unfortunate when a software or firmware update is occurring as this may cause instability in the operation of portable computing device 110. Accordingly, portable computing device 110 may remove power on line ACC POWER 370 in order to protect its battery.

This removal of power may in turn remove power from multiplexers 940. But this in turn may disconnect data paths that extend from accessory 130 through receptacle 128 and multiplexers 940 to plug 125 and portable computing device 110. Accordingly, embodiments of the present invention may provide an alternate power source for multiplexers 940. An example is shown in the following figure.

Figure 11:
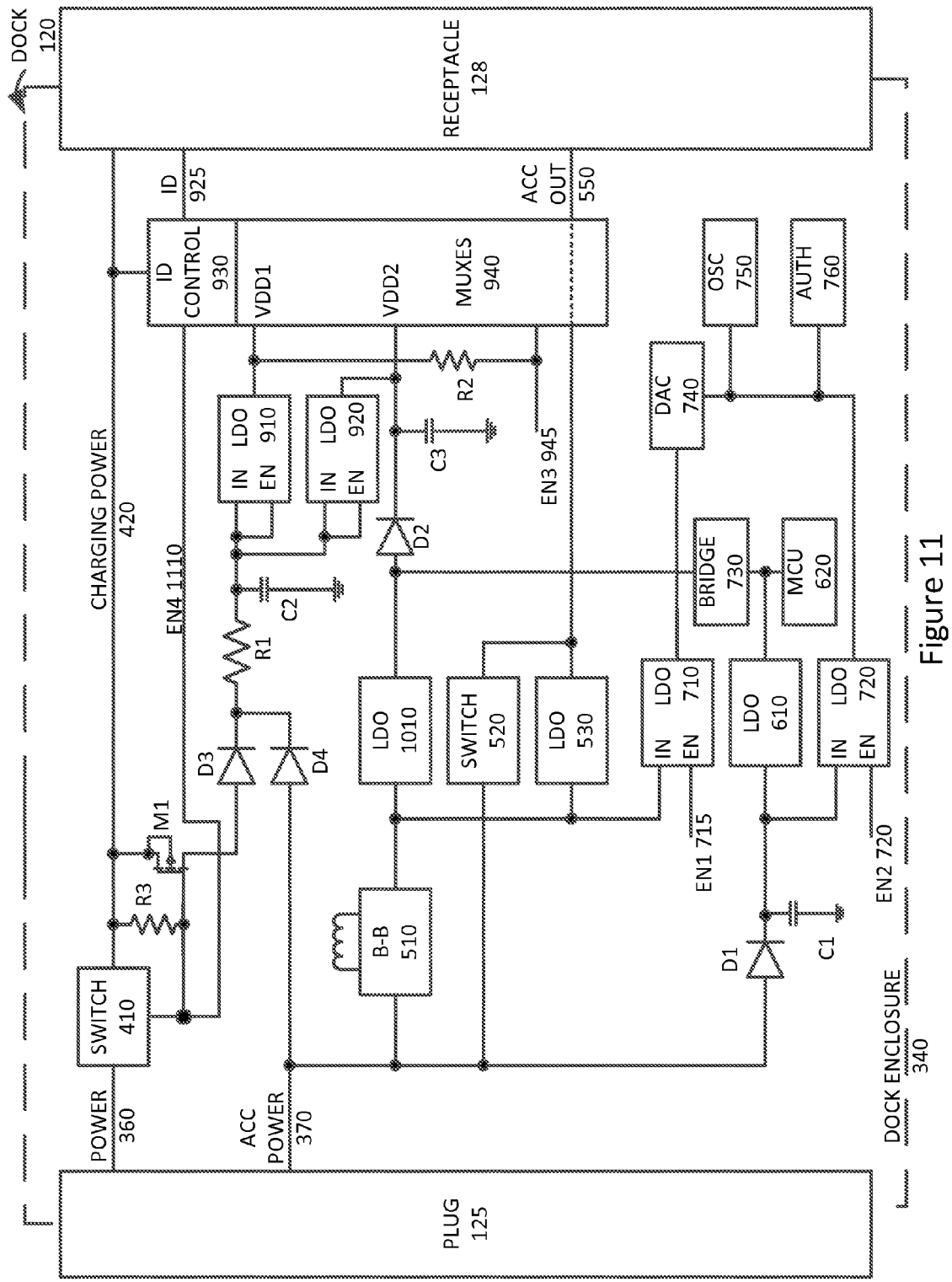
FIG. 11 illustrates a docking station having an alternate source of power for a circuit according to an embodiment of the present invention.

FIG. 11 illustrates a docking station having an alternate source of power for a circuit according to an embodiment of the present invention. In this example, the circuit is multiplexing circuit 940. Power may be provided to low-dropout regulators 910 and 920 by either a voltage on line ACC POWER 370 or a voltage on line CHARGING POWER 420. Disconnect diodes D3 and D4 may act as an "OR" function providing the higher voltage to the inputs of low-dropout regulators 910 and 920 via resistor R1. In this way, the voltage on line CHARGING POWER 420 may power low-dropout regulators 910 and 920 via resistor R1 and D3 when ACC POWER 370 is absent, due to an update of for other reason. This may ensure that multiplexers 940 remaining configured during a software or firmware update of portable computing device 110.

Again, receptacle 128 may receive a Lightning connector insert. When a Lightning connector insert is disconnected from receptacle 128, voltages at its contacts may be disabled or in a high impedance state. These voltages may remain in this state until the connector insert is initially inserted into receptacle 128. Drawing current when a supply is in a high impedance state may cause the supply voltage to drop to near zero. Accordingly, it is undesirable at this time to draw current from line CHARGING POWER 420 via low-dropout regulators 910 and 920. Accordingly, embodiments the present invention may include a switch, such as transistor M1, that may be open until a connector insert at receptacle 128 exits its high impedance state.

Specifically, when the voltage supplies on a connector insert at receptacle 120 are in high-impedance state, very little power is available to docking station 120. Accordingly, transistor M1 may be open and power draw may be essentially limited to establishing identification and authentication over ID line or bus 925 using ID control circuit 930. Once this identification and authentication handshaking is completed, the connector insert at receptacle 128 may exit its high-impedance state and provide full power on line CHARGING POWER 420. In this situation, transistor M1 may close such that a voltage on CHARGING POWER 420 may provide power to low-dropout regulators 910 and 920 as needed.

Again, in this embodiment of the present invention, the higher of either a voltage on CHARGING POWER 420 or ACC POWER 370 may be provided through diodes D3 and D4 to low-dropout regulators 910 and 920. In other embodiments of the present invention, transistor M1 may be open such that power is not drawn from accessory 930 whenever power is available from the portable computing device 110 on line ACC POWER 370. In still other embodiments of the present invention, when portable computing device 110 is not connected to plug 125, transistor M1 may be open since there is no need at that time to provide power to low-dropout regulators 910 and 920. While in these examples M1 is opened to disconnect CHARGING POWER 420 from low-dropout regulators 910 and 920, in other embodiments of the present invention, other devices, switches, circuits, or other components may be used to disconnect this path. For example, the EN inputs to low-dropout regulators 910 and 920 may be modified to accept an input that disables them in this condition.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

Thus, it will be appreciated that the invention is intended to cover all modifications and equivalents within the scope of the following claims.

What is claimed is:

1. A docking station comprising:
 a housing;
 a connector insert located on the housing and arranged to mate with a connector receptacle on a portable computing device;
 a second connector to connect to an accessory;
 a first regulator having an input coupled to the connector insert to receive power from the portable computing device, the first regulator further having an output coupled to the second connector to provide power to a first type of accessory; and
 a first switch having an input coupled to the connector insert to receive power from the portable computing device and having an output coupled to the second connector to provide power to a second type of accessory.

2. The docking station of claim 1 further comprising a second regulator to power a microprocessor, a diode between the first connector and an input of the second regulator, and a capacitor between the input of the second regulator and ground.

3. The docking station of claim 2 wherein an anode of the diode is coupled to the first connector and a cathode of the diode is coupled to the input of the second regulator.

4. The docking station of claim 1 wherein the input of the first switch is coupled to the input of the first regulator and the output of the first switch is coupled to the output of the first regulator.

5. The docking station of claim 4 wherein the first regulator is a low-dropout regulator.

6. The docking station of claim 5 further comprising a second regulator coupled between the connector insert and the first regulator.

7. The docking station of claim 6 wherein the second regulator is a buck-boost regulator.

8. The docking station of claim 7 wherein the connector insert is a Lightening connector insert.

9. The docking station of claim 7 wherein the portable computing device comprises a smart phone.

10. The docking station of claim 7 wherein a second type of accessory is an accessory having a first voltage requirement.

11. The docking station of claim 7 wherein a second type of accessory is an accessory made by a specific vendor.

12. The docking station of claim 7 wherein the second connector is located on the housing and comprises a connector receptacle.

13. The docking station of claim 7 wherein the second connector comprises a connector insert and the connector insert connects to the docking station via a cable.

14. The docking station of claim 1 wherein the input of the first switch is coupled to the input of the first regulator and the output of the first switch is directly connected to the output of the first regulator.

15. The docking station of claim 1 further comprising:
 a first circuit; and
 a power circuit to provide power to the first circuit from either the portable computing device or an accessory in a first mode, and to provide power to the first circuit from an accessory in a second mode,
 wherein in the first mode, the power circuit provides power to the first circuit from the portable computing device when a voltage provided by the portable computing device is higher than a voltage provided by the accessory, and the power circuit provides power to the first circuit from the accessory when a voltage provided by portable computing device is lower than a voltage provided by the accessory.

16. The docking station of claim 15 wherein the first circuit comprises a multiplexing circuit.

17. The docking station of claim 16 wherein the multiplexing circuit multiplexes signals at the second connector such that the second connector may be reversible.

18. The docking station of claim 15 wherein the second mode is a programming mode for the portable computing device.

19. The docking station of claim 15 wherein the power circuit comprises a second regulator coupled to the connector insert and further coupled to the second connector.

20. The docking station of claim 19 wherein the second regulator comprises a low-dropout regulator.

21. The docking station of claim 20 wherein the power circuit further comprises a first disconnect diode between the connector insert and the power circuit and a second disconnect diode between the second connector and the power circuit.

22. The docking station of claim 21 further comprising an resistor in series between the first and second disconnect diodes and an input of the power circuit, and a first capacitor between the input of the power circuit and ground.

23. The docking station of claim 22 further comprising a second switch between the second disconnect diode and the second connector.

24. The docking station of claim 23 wherein the power circuit further comprises a third regulator having an input coupled to the input of the second regulator.

25. The docking station of claim 24 further comprising:
a fourth regulator having an input coupled to the input of the first regulator;
a third disconnect diode coupled between an output of the fourth regulator and an output of the third regulator; and
a second capacitor coupled between the output of the third regulator and ground.

26. The docking station of claim 15 wherein the second connector is located on the housing and comprises a connector receptacle.

27. The docking station of claim 15 wherein the second connector comprises a connector insert and the connector insert connects to the docking station via a cable.

28. The docking station of claim 15 wherein the power from the portable computing device is provided by a battery on the portable computing device.

29. The docking station of claim 1 wherein the first switch is current limited.

* * * * *